Feb. 5, 1957 R. L. FRANK 2,780,807
RADIO FREQUENCY SAMPLING DETECTOR
Filed Aug. 30, 1952 2 Sheets-Sheet 1
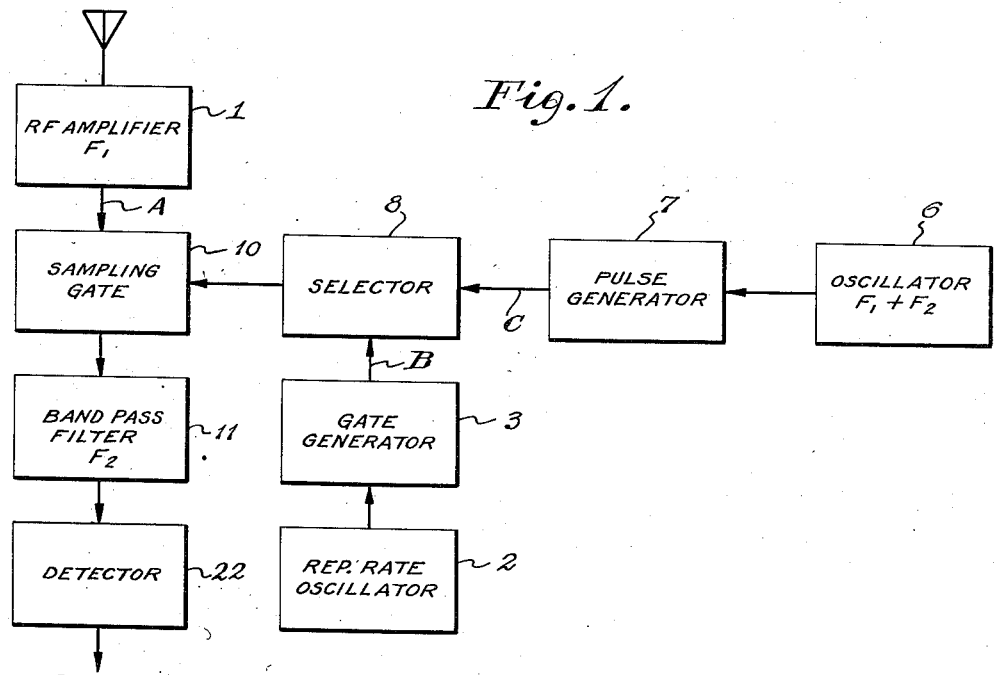
Fig. 1.
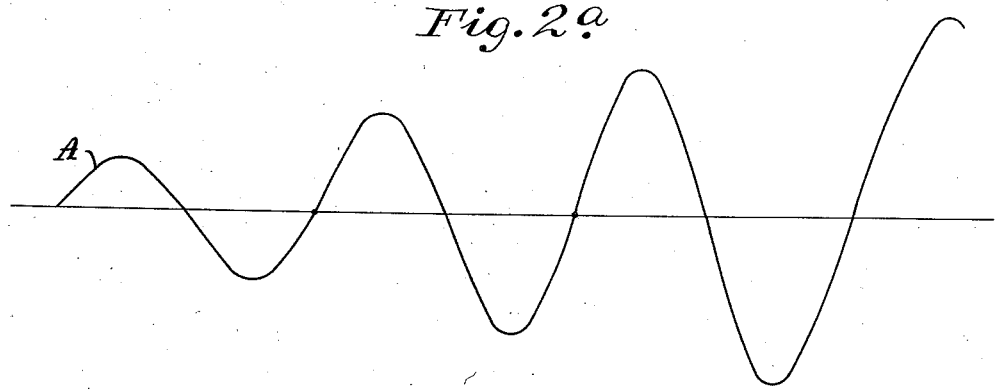
Fig. 2a.
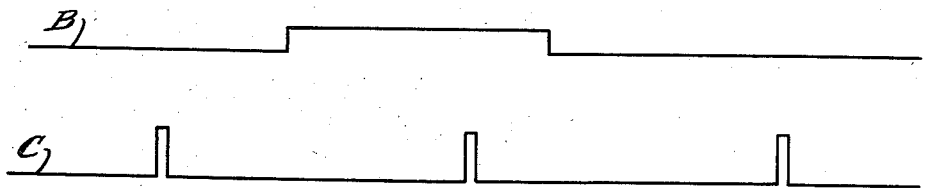
Fig. 2b.
Fig. 2c.
INVENTOR
ROBERT L. FRANK
BY James P. Malone
ATTORNEY

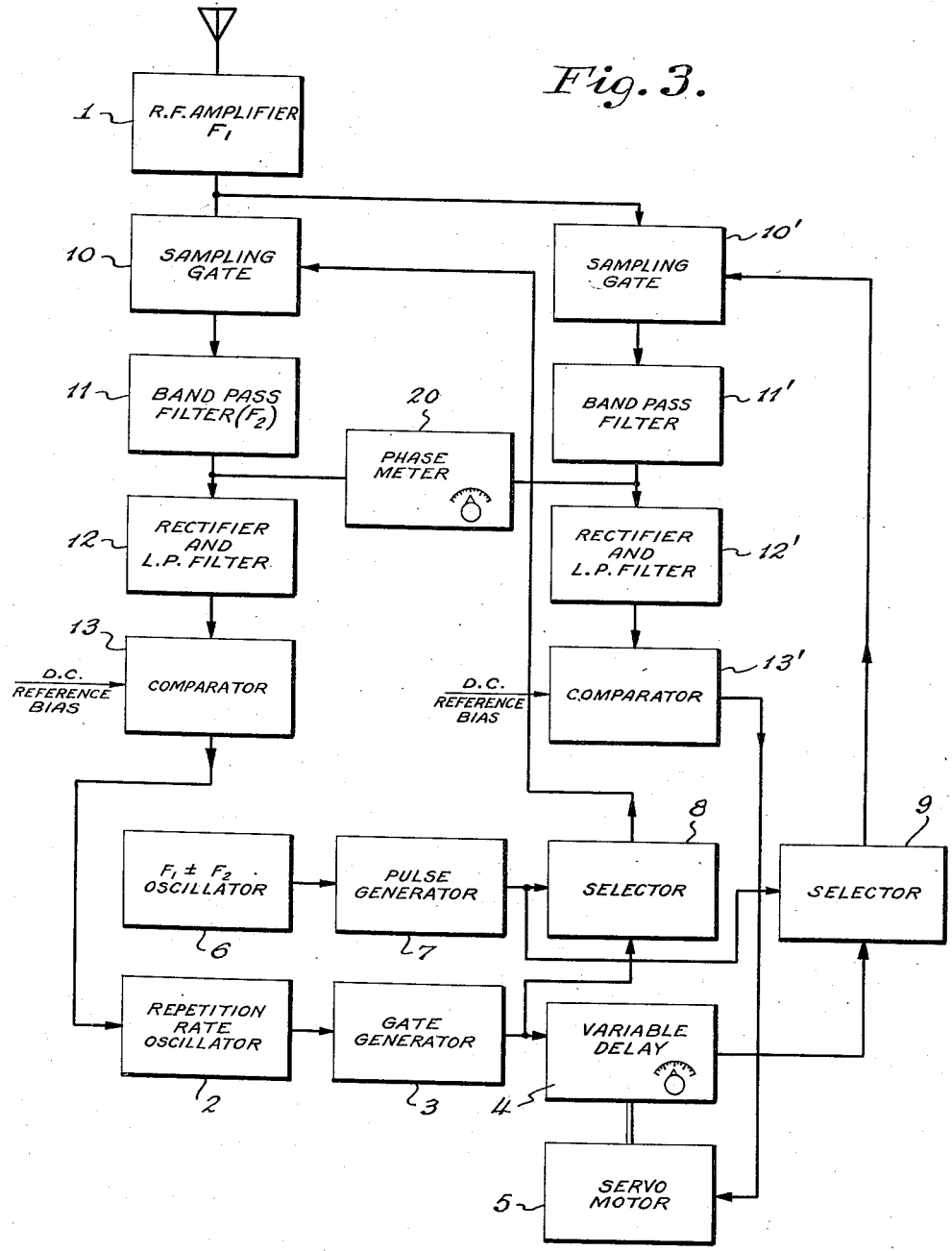

United States Patent Office 2,780,807
Patented Feb. 5, 1957

2,780,807

RADIO FREQUENCY SAMPLING DETECTOR

Robert L. Frank, Great Neck, N. Y., assignor to Sperry Rand Corporation, a corporation of Delaware Application August 30, 1952, Serial No. 307,347

7 Claims. (Cl. 343—103)

This invention relates to radio detection apparatus, and more particularly to the detecting means of the sampling gate type.

Ordinary amplitude detection of signals in a diode detector is limited by the well-known phenomenon of signal suppression by noise. Two important aspects of the suppression phenomenon in the case of envelope detection are:

Firstly, that the average output of a conventional detector in the presence of an unfavorable signal-to-noise ratio is less than in the absence of noise, and Secondly, that the slope of the D. C. output characteristic of a conventional detector approaches zero as the carrier strength approaches zero.

The physical basis of these results may be better understood by considering that the vector sum of the carrier amplitude, A, plus a typical noise amplitude, B, is a resultant vector of length, R. If $\phi$ is the instantaneous phase difference between vectors A and B, the average value of R for random values of $\phi$ (while vector B is held constant) will occur when $\phi$ is somewhere between the extremes of 0° and 360°. Thus the size of the vectorial triangle will have the relation of $$R<A+B, \text{ or } R-B<A$$

Averaging over the various values of B, there results $$R_{av}-B_{av}<A$$

Since $R_{av}-B_{av}$ is the useful detector output when the carrier is added to the noise, the derived inequality states in effect that the detector output is suppressed by the noise. In other words, the increase in the detector output when the carrier is added to the noise is less than the carrier amplitude because on the average the carrier is at some out-of-phase angle rather than being in-phase.

The second important feature of the suppression phenomenon is that the D. C. output characteristic of a conventional envelope detector approaches zero slope as the R. M. S. R. F. carrier-to-noise ratio approaches zero. In other words, the output vs. input characteristic begins with a zero slope and thus the first order response to an infinitesimal characteristic is zero. This may be understood by considering a small carrier vector added to a large noise vector at a random phase angle. It may be readily appreciated from empirical test of various angles that to a first approximation the carrier subtracts from the noise just as much as it adds to the noise, and consequently, the increase in the average output when the carrier is included is essentially zero.

The detector action may be indicated by the analytical function F(R), the carrier amplitude by A, and the noise by B and $\phi$, as has been explained in connection with the vectorial triangle. Mathematically, it is desired to show that the derivative $dF_{av}/dA=0$, when evaluated at $A=0$. First it is noted that $$\frac{dF_{av}}{dA}=\left(\frac{dF}{dA}\right)_{av}=\left(\frac{dF}{dR}\right)\left(\frac{dR}{dA}\right)_{av}$$

so that the problem reduces to establishing that $$(dR/dA)_{av}=0$$

when $A=0$. Application of the law of cosines to the vectorial triangle gives $R^2=A^2+B^2+2AB\cos\phi$, and the derivative is $dR/dA=(A+B\cos\phi)(A^2+B^2+2AB\cos\phi)^{-\frac{1}{2}}$. As the carrier amplitude, A, approaches zero, this derivative approaches $\cos\phi$. Now since $\phi$ is random and consequently all values of $\phi$ are equally likely, $\cos\phi$ will average zero, so that $(dR/dA)_{av}=0$, when $A=0$.

The foregoing mathematical proof may be generalized to show that any detector system, however complex, which depends on envelope magnitude for its detection without regard to the phase of the R. F. will have a D. C. characteristic which starts out with zero slope. This generalization is important since it necessarily implies that use must be made of phase information or another characteristic which is independent of envelope magnitude before a major improvement in weak signal detection can be expected to be achieved. Since noise is proportional to band width, it is desirable to narrow the band width as much as possible before diode detection. The present invention discloses detection means having improved signal to noise ratio and adapted to detect received pulses such as those received in a Loran navigation system. It comprises a radio receiver, and a novel radio frequency sampling circuit for sampling portions of a radio frequency cycle in each pulse. The sampling circuit is triggered at a frequency slightly different than the radio frequency so that it scans the radio frequency cycles at the difference frequency which may be, for instance, five cycles per second. This low frequency component is then filtered in a very narrow band pass filter and the signal is then detected. The sampling and band pass filter is before the detection so that the suppression due to noise is minimized.

Accordingly, a principal object of the invention is to provide new and improved radio detection apparatus.

Another object of the invention is to provide new and improved pulse detection means.

Another object of the invention is to provide new and improved radio cycle matching apparatus.

Another object of the invention is to provide new and improved pulse detection means for Loran navigation apparatus.

Another object of the invention is to provide new and improved means to improve signal-to-noise ratio of received radio signals.

Another object of the invention is to provide means for minimizing the noise suppression phenomenon of conventional detectors.

These and other objects of the invention will be apparent from the following specifications and drawings of which, Fig. 1 is a block diagram of the embodiment of the invention;

Fig. 2 comprises a series of waveforms illustrative of the operation of the invention;

Fig. 3 is a block diagram of another embodiment of the invention.

Fig. 1 shows a simplified embodiment of the invention. It will be explained in connection with the waveforms in Fig. 2. Pulsed radio frequency waves are received in receiver amplifier 1. Fig. 2A shows the radio frequency waves occurring at the beginning of a pulse.

The oscillator 6 generates a frequency $F_1+F_2$ where $F_2$ is a very small frequency, for instance, five cycles, and where $F_1$ is the radio frequency received. The pulse generator 7, connected to oscillator 6, provides pulses Fig. 2C which are short with respect to the radio frequency wave length. These pulses have a frequency slightly different from the radio frequency $F_1$ so that they change phase relative to, i. e., scan, the radio frequency at the difference frequency $F_2$.

The oscillator 2 generates a signal at the known repetition rate frequency of received pulses, for instance, the Loran repetition rate. This signal is applied to the gate generator 3 which generates a gate pulse Fig. 2B having a duration equal to a full cycle of the radio frequency $F_1$. The gate Fig. 2B and the short pulses Fig. 2C are applied to a selector circuit 8, which passes these short pulses when there is a coincidence of the two inputs. The effect of this is that one of the short pulses is passed each pulse repetition period, and this pulse is used to sample radio frequency waves in the sampling gate 10. The output of the sampling gate 10 is the amplitude of the radio frequency wave which occurs during the short sampling pulse C. In other words, a short time sample of the radio frequency wave is taken. Since the sampling frequency $F_1+F_2$ differs from the radio frequency $F_1$ the output of the sampling gate will have an alternating voltage component $F_2$. This alternating voltage is then filtered in the filter 11, which may be made very selective. For instance, this band pass may be of the order of a half cycle. Because noise will have comparatively very little of the extremely low frequency content, such as $F_2$, the effect of this very low band pass is, to eliminate a very great proportion of the noise received with the signal. Only then, after the greater proportion of noise has been filtered, is the signal passed to a conventional diode detector 22. This is a noteworthy departure from conventional detection techniques and is a most important aspect of the present invention. As a result the noise suppression will be minimized since the signal has been sampled and filtered very carefully before it is applied to any detector which may be subject to the noise suppression phenomenon.

The present invention is especially suited to use with a system wherein pulsed R. F. energy is received at fixed, determinable recurrence rates and where the R. F. oscillations contained within the pulse envelope are phase coherent from one pulse to another. Obviously, the absence of such phase coherency largely negates the value and advantages of the present invention which reside in accurate pulse envelope detection, and also in utilization of R. F. phase information for the purpose of more accurately relating the R. F. cycles so determined to other R. F. cycles, a pulse envelope, or any other known reference.

One type of application to which the present invention is ideally suited is radio navigation systems such as, for instance, Loran. It is of utmost importance in navigating by the use of a Loran receiver that the envelopes formed by pulses of R. F. energy received by the craft to be navigated are accurately fixed in time so that the time difference as to their arrival at the craft may be precisely determined. A still more accurate and improved refinement may be used in addition to pulse envelope matching by relating the phase coherent R. F. cycles within the pulse envelopes to a known reference and thereby determine the time difference of arrival of pulses in a quasi vernier fashion. One difficulty which arises in the use of radio navigation systems such as those of the Loran type is that the system loses its effectiveness and accurate usefulness as the transmitted signals become weaker and the noise at the receiver becomes proportionally stronger. A point is reached where the noise equals or overcomes the signal strength and under these conditions the Loran receiver may be rendered virtually useless as a navigational aid unless a means of overcoming the unfavorable signal-to-noise ratio is employed. It is to be understood that the present invention would in all probability not be employed if a favorable signal-to-noise ratio existed. The present invention finds its most practical application in overcoming poor signal-to-noise ratios at the receiver where conventional and usual means of detection are no longer effective due to the phenomenon of noise suppression.

A co-pending application S. N. 243,710, filed August 15, 1951, in the name of Philip W. Crist and assigned to the assignee of the present invention, is directed to the same general problem of overcoming the noise suppression phenomenon encountered when conventional detection techniques are utilized in the presence of an unfavorable signal-to-noise ratio. That pending application, however, requires as one of its basic components a gate which is precisely phase coherent with the R. F. and therefore necessarily involves the attendant practical difficulties presented by the problem of such phase coherent gate generation at the receiver in the face of an unfavorable signal-to-noise ratio.

In accordance with the present invention one slowly drifting gate is employed which, of course, is not phase coherent with the R. F.; the remaining and only other basic gate necessary to carry out the present inventive concept need only be phase coherent relative to the R. F. within practicable and readily achievable tolerances. It is in this sense that the term "synchronous" gate is used throughout the instant disclosure and claims.

Additionally, the sampling gate of the invention disclosed by Crist produces a D. C. output in which the signal component is undistinguishable from spurious components which may be due to unbalance, drift, and other imperfections of known types of sampling gates. Contrasted to this, the present invention produces a sampling gate output in the form of a low frequency A. C. which may be readily separated from spurious undesirable D. C. components.

Fig. 3 shows an embodiment of the invention used in a Loran-type receiving system, when it is desired to measure the delay between received pulses. Pulsed Loran master and slave radio frequency ($F_1$) signals are received in receiver 1 which may be a tuned radio frequency amplifier. Oscillator 2 provides signals at the repetition rate of the incoming signals, i. e., the Loran repetition rate. The repetition rate signals initiate gate pulses in gate pulse generator 3, which are substantially equal in duration to at least one radio frequency cycle of $F_1$.

A local radio frequency oscillator 6 generates a frequency $F_1 \pm F_2$ where $F_2$ is a very low frequency such as five cycles. These signals are connected to a pulse generator 7 which provides short pulses which are narrow compared to a radio frequency cycle. The short pulses from generator 7 and the repetition rate gate pulses from generator 3 are connected to a selector 8 which may be a coincidence-type circuit, the purpose of which is to pass the radio frequency pulses only at the gated time during the repetition interval. The pulses passed through selector 8 are connected to sampling circuit 10 which is also connected to the output of radio frequency amplifier 1. Therefore, the pulses applied to the sampling gate 10 sample the radio frequency once each repetition period.

The sampling gate circuit 10 may be of the four diode type shown in the Proceedings of the Institute of Radio Engineers for January 1943, page 12. The function of the gate 10 is to sample the amplitude of the radio frequency at a particular instant. The sampling pulses may have a frequency $F_1$ plus or minus $F_2$, therefore, the sampling pulses drift relative to the radio frequency signals. Any other of several well-known methods of combining frequencies to achieve a slight drift of one frequency with respect to the other may be used. For instance, the desired result may be effected by generating $F_1$ at a frequency equal to the R. F. and generating $F_2$ at a frequency slightly different from either the pulse recurrence frequency or any suitable harmonic of the pulse recurrence frequency. $F_2$ may then be combined with $F_1$ by addition or subtraction to produce a resultant frequency which will drift slowly with respect to the R. F. The most important consideration in generating a properly workable drift frequency in accordance with the present invention is that the difference between the drift frequency and the R. F. (or any sum or difference of the R. F. and a harmonic of the pulse recurrence frequency) should be substantially less than the pulse recurrence frequency, i. e., a small portion of the pulse recurrence frequency. It is to be understood that the language of this disclosure and the claims is intended to embrace all such obvious equivalent methods of generating a workable drift frequency and the teaching of filtering the lowest practicable difference frequency resulting therefrom in accordance with the present invention. After a number of samples are taken, a version of at least one complete radio frequency cycle will be obtained at the frequency $F_2$, which is a very low frequency, for instance 5 cycles. If the first gate pulse generator 3 is not exactly phase coherent with the R. F. of the pulses at all times, the output of the sampling means will merely be slightly more than one complete radio frequency cycle. This output is then passed through band pass filter 11 which is tuned to the frequency $F_2$, that is 5 cycles. The pass band of the filter 11 may be very narrow, for instance ½ cycle, so that it is very selective and eliminates a great proportion of the noise. The output of the filter 11 is supplied to rectifier 12, which may be a conventional rectifier. The output of the rectifier stage 12 preferably includes a low pass filter.

The detected signal is then applied to a comparator circuit 13, including a difference circuit, for instance a resistor network, where it is compared with a reference bias voltage. The output stage of the comparator, for instance a reactance tube, is used to regulate the phase of the repetition rate oscillator 2, so that it will be synchronized with the incoming pulses. The (D. C.) reference bias may be a battery. Alternatively, the reference bias may be connected in series opposition to the input of comparator circuit 13 and the difference network eliminated.

The Loran slave signals are similarly detected in sampling gate 10', a band pass filter 11', rectifier and low pass filter 12', and comparator circuit 13' which preferably has an amplifier to drive servomotor 5. It should be noted that the slave signals are also sampled and filtered in a very narrow band pass filter before they are applied to the conventional rectifier, so that the suppression due to noise in the conventional rectifier is minimized. One sampling gate could be utilized to sample both master and slave signals by providing suitable time sharing means to switch its output to the proper channel. The switch could be a relay actuated at the pulse repetition rate.

The slave signals applied to the sampling gate 10' have the same recurrence or repetition rate as those applied to gate 10, except that they are delayed by an amount proportional to the Loran time difference reading effectuated by the operation of the variable delay 4 and selector 9. The variable delay circuit 4 is controlled by the output of the comparator circuit 13' through the servomotor 5. One output of the gate generator 3 synchronizes on a master pulse, and another output is delayed by the variable delay 4, and synchronizes on the slave pulse. Therefore, the amount of time interval interposed by adjustable delay means 4 to match corresponding points on the pulse envelopes of the received master and slave pulses is the Loran time difference which is the significant Loran navigational information.

It is assumed that the master and slave pulses are correctly identified orignally by the operator in accordance with conventional practice utilizing apparatus outside the scope of the present invention, which relates to the detector system.

More precise Loran delay information can be obtained directly from the outputs of the filters 11 and 11' by means of the phase meter 20 which effectively measures the phase difference between the gated R. F. cycles of the master and slave pulses. This result could be obtained since the output of the band pass filters 11 and 11' each contain a voltage $F_2$, the relative phase of which is proportional to the phase of the radio frequency $F_1$ of the master and slave pulses.

Conventional sampling circuits have a direct voltage output which is quantized, i. e., varies in steps, whereas the present invention provides an alternating voltage output. The advantage of this is that all direct voltage may be eliminated from the output of the sampling gate and also very narrow band pass filters may be used to provide effective pre-detection narrow banding with consequent minimization of the well-known noise suppression phenomenon which occurs in the conventional amplitude detectors.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a Loran receiver, means to improve signal-to-noise ratio of master signals comprising a radio frequency amplifier adapted to receive radio frequency signals, a sampling gate connected to said amplifier and adapted to sample small portions of said radio frequency signals, means connected to trigger said sampling gate at a frequency slightly different than said radio frequency, and a bandpass filter connected to said sampling gate and adapted to pass only the components of said difference frequency, a rectifying detector connected to the output of said bandpass filter whereby noise suppression in said rectifier is minimized by said sampling and filter, means to improve signal-to-noise ratio of slave signals comprising sampling gate connected to said amplifier and adapted to sample small portions of said radio frequency signals, means connected to trigger said sampling gate at a frequency slightly different from said radio frequency, a second band pass filter connected to said sampling gate and a second rectifying detector connected to said second band pass filter, means connected to said first and second detectors to measure the time difference between said master and slave signals, and means connected to said first and second filters to measure the phase difference between their outputs.

2. A system for determining the amplitude and phase of a radio frequency cycle within recurrent pulses in the presence of an unfavorable signal-to-noise ratio comprising, means to synchronously gate at least one radio frequency period at the recurrence rate of said pulses, means to generate a second gate of small duration relative to said first gate at a frequency different from said radio frequency, the value of said second gate frequency being such that said second gate will slowly drift with respect to said radio frequency, means to sample said radio frequency during the coincidence of said first and second gates, filter means to receive said sampled signals and pass only the difference frequency between said second gate and the radio frequency, whereby the output of said filter is a measure of the amplitude and phase of the radio frequency cycle gated by said first gate.

3. A system for determining the amplitude and phase of a radio frequency cycle within recurrent pulses in the presence of an unfavorable signal-to-noise ratio comprising, means to synchronously gate at least one radio frequency period at the recurrence rate of said pulses, means to generate a second gate of small duration relative to said radio frequency period at a frequency which differs from said radio frequency by substantially less than the value of the recurrence rate of said pulses, means to sample that portion of the gated radio frequency cycle within said pulses which progressively coincides with said second gate, filter means to receive said sampled signals and pass only that frequency by which said second gate differs from said radio frequency, whereby the output of said filter is a measure of the amplitude and phase of the radio frequency cycle gated by said first gate.

4. A system for determining the amplitude and phase of a radio frequency cycle within recurrent pulses in the presence of an unfavorable signal-to-noise ratio comprising, means to synchronously gate at least one radio frequency period at the recurrence rate of said pulses, means to produce a second gate of small duration relative to said radio frequency period at a frequency which differs from the sum of the radio frequency added to the pulse recurrent rate by an amount substantially less than the value of the pulse recurrence rate, means to sample successive portions of said gated radio frequency cycle as said second gate progressively coincides with adjacent increments of said first gate, filter means to receive said sampled signals and pass only that frequency by which said second gate differs from the sum of the radio frequency added to the pulse recurrence rate, whereby the output of said filter is a measure of the amplitude and phase of the radio frequency cycle gated by said first gate.

5. A timing apparatus for measuring the time difference between two recurrent pulse envelopes of radio frequency energy in the presence of an unfavorable signal-to-noise ratio comprising, means to generate a first gate in synchronism with one of said pulses, means to generate a second gate of small duration relative to said first gate and of a frequency which differs from said radio frequency by substantially less than the value of said recurrence rate, adjustable delay means for delaying said first gate by a selectable time interval, means to sample increments of one received pulse during the progressive coincidence of said first and second gates, means to sample increments of the other received pulse during the progressive coincidence of said delayed first gate and said second gate, dual filter means connected to receive the respective sampled increments of said two recurrent pulses and adapted to pass only that frequency by which said second gate differs from said radio frequency, means responsive to the outputs of said filters to indicate the phase difference therebetween, and means to detect the amplitude of said respective filter outputs, whereby the time interval effected by said delay means to match said detected filter outputs is a measure of time difference between said two recurrent pulse envelopes and the indicated phase difference between said filter outputs is a like measure of a substantially higher order of accuracy.

6. A timing apparatus for measuring the time difference between two recurrent pulse envelopes of radio frequency energy in the presence of an unfavorable signal-to-noise ratio comprising, means to generate a first gate substantially in synchronism with one of said pulses, means to generate a second gate of small duration relative to said first gate and of a frequency which differs from said radio frequency by substantially less than the value of said recurrence rate, adjustable delay means for delaying said first gate by a determinable time interval, means to sample increments of one received pulse during the progressive coincidence of said delayed first gate and said second gate, filter means connected to separately receive the respective sampled increments of said two recurrent pulses and adapted to pass only that frequency by which said second gate differs from said radio frequency, means to derive signals proportional to the respective amplitude of each filter output, and means to compare said last-named signals for producing an output signal dependent upon the difference therebetween, whereby the time interval effected by said delay means to null the output of said comparator means is a measure of the time difference between said two recurrent pulses.

7. A timing appartus for measuring the time difference between two recurrent pulse envelopes of radio frequency energy in the presence of an unfavorable signal-to-noise ratio comprising, means to generate a first gate in synchronism with one of said pulses, means to generate a second gate of small duration relative to said first gate and of a frequency which differs from said radio frequency by substantially less than the value of said recurrence rate, adjustable delay means for delaying said first gate by a selectable time interval, means to sample increments of one received pulse during the progressive coincidence of said first and second gates, means to sample increments of the other received pulse during the progressive coincidence of said delayed first gate and said second gate, dual filter means connected to receive the respective sampled increments of said two recurrent pulses and adapted to pass only that frequency by which said second gate differs from said radio frequency, and means responsive to the outputs of said filters to indicate the phase difference therebetween, a source of reference signal, means to derive signals proportional to the respective amplitude of each filter output, dual comparator means connected to receive said last-named signals and said reference signal for producing difference signals proportional to the amplitude differences between the respective inputs thereto, means responsive to one of said difference signals to adjust the frequency of said first gate generator, and means responsive to said other difference signal to adjust said delay means, whereby the time interval effected by said delay means is a measure of the time difference between said recurrent pulse envelopes accurate to an order of precision of greater than one radio frequency period and the indicated phase difference between said filter outputs is a like measure of a substantially higher order of accuracy.

References Cited in the file of this patent

UNITED STATES PATENTS

| | | |
|---|---|---|
| 2,491,029 | Brunn | Dec. 13, 1949 |
| 2,516,356 | Tull et al. | July 25, 1950 |
| 2,536,801 | Emerson | Jan. 2, 1951 |
| 2,543,072 | Stearns | Feb. 27, 1951 |